United States Patent [19]

Wada et al.

[11] Patent Number: 5,262,393
[45] Date of Patent: Nov. 16, 1993

[54] LAYERED COPPER OXIDES $(R_{(1+x)}CE_{(2-x)})SR_2CU_2(M_{1-y}CU_y)O_{11}$ WHEREIN R IS A RARE EARTH ELEMENT AND M IS ONE OR BOTH OF PB AND TL

[75] Inventors: Takahiro Wada, Katano; Ataru Ichinose, Yokohama; Kazuyuki Hamada, Funabashi; Hisao Yamauchi, Nagareyama; Shoji Tanaka, Tokyo, all of Japan

[73] Assignees: Matsushita Electric Industrial Co., Ltd., Osaka; International Superconductivity Technology Center; Central Research Institute of Electric Power Industry, both of Tokyo; Ube Industries, Ltd., Ube, all of Japan

[21] Appl. No.: 781,315

[22] Filed: Oct. 25, 1991

[30] Foreign Application Priority Data

Oct. 31, 1990 [JP] Japan .................................. 2-296745

[51] Int. Cl.$^5$ ................... C01F 11/02; C01F 17/00; C01G 3/02; H01L 39/12
[52] U.S. Cl. ........................... 505/1; 252/518; 252/521; 505/775; 505/776; 505/783
[58] Field of Search .................... 252/518, 521; 505/1, 505/783, 775, 776

[56] References Cited

PUBLICATIONS

Rouillon "Pb$_2$Sr$_2$LnCeCu$_3$O$_{10+\delta}$, A new member of layered..." *Physica C* 167 Apr. 15, 1990 pp. 107–111.
Mochiku "A new family of . . . (Tl$_{1-z}$Pb$_z$)(Sr$_{1-x}$La$_x$)$_2$(Ln$_{1-y}$Cu$_y$)$_2$Cu$_2$O$_9$..." *Jap. Jnl. Appl. Phys.* vol. 29(4) Apr. 1990 pp. L588–L590.
Maeda "Synthesis and structural analysis of . . . (Pb,Cu)(Sr,R)$_2$(R',Ce)$_2$Cu$_2$O$_z$..." *Physica C.* 177 Jul. 7, 1991 pp. 337–344.
Tokiwa "Synthesis and crystal structure of Pb$_2$Sr$_2$(Ln, Ce)$_n$Cu$_3$O$_{6+2n+\delta}$..." *Physica C* 181 Oct. 10, 1991 pp. 311–319.
Nobumasa "Layered copper oxides designed by the combination..." *Z. Phys. B–Cond. Matter* 83 Apr. 1991 pp. 19–22.
Mochiku "Crystal structure of a new copper-oxide compound..." *Jap. Jnl. Appl. Phys.* vol. 29(8) Part II, Aug. 1990 pp. 1406–1408.
Kotai Butsuri (Solild State Physics) vol. 25, No. 10, 1990, pp. 618–636.
K. Yvon, et al, Crystal structures of high-Tc oxides, *Z. Phys. B–Condensed Matter* 76, 1989, pp. 413–444.
Maeda, et al, "New Superconducting Cuprates (Pb,Cu)(Eu,Ce)$_2$(Sr,Eu)$_2$Cu$_2$O$_z$," *Physica C*, vol. 169, No. 1, 2, pp. 133–136, Jul. 1990.

(List continued on next page.)

*Primary Examiner*—Paul Lieberman
*Assistant Examiner*—John Boyd
*Attorney, Agent, or Firm*—Stevens, Davis, Miller & Mosher

[57] ABSTRACT

The present invention provides a layered copper oxide as an insulator for superconductor or as a superconductor, which has a chemical composition represented by the formula of (R,Ce)$_3$Sr$_2$Cu$_2$(M,Cu)O$_{11}$, wherein R is a rare earth element other than Ce and M is one or both of Pb and Tl, and has a crystal structure comprising a (M,Cu)Sr$_2$(R,Ce)Cu$_2$O$_7$; unit of a TlBa$_2$CaCu$_2$O$_7$(1-2-1-2)-type structure and a [(R,Ce)O$_2$]$_2$ unit of a fluorite-type structure alternately put on each other, or a chemical composition represented by the formula of (R,Ce)$_3$Sr$_2$Cu$_2$(M,Cu)O$_{10+z}$, wherein R is a rare earth element other than Ce, M is one or both of Pb or Tl, and has a crystal structure comprising a (R,Ce)Sr$_2$Cu$_2$(Cu,M)O$_{6+z}$ unit of a YBa$_2$Cu$_3$O$_{3}$O$_{6+\delta}$-type structure and a [(R,Ce)O$_2$]$_2$ unit of a fluorite-type structure alternately put on each other, wherein z is in the range of $0 \leq z \leq 2$ and $\delta$ is in the range of $0 \leq \delta \leq 1$.

2 Claims, 6 Drawing Sheets

OTHER PUBLICATIONS

Yamaguchi, et al, "HRTEM study of new superconducting lead cuprate $(Pb,Cu)(Eu,Ce)_2(Eu,Sr)_2Cu_2O_z$", Physica C, vol. 170, No. 5, 6, pp. 486–490, Oct. 1990.

Wada, et al, "New families of layered Cuprates Containing Double-$MO_2$-Unit Fluorite Blocks: $(Ho,Ce)_3Sr_2Cu_3O_{11}$ and $(Ho_2Ce)_3Sr_2Cu_2(Cu,M)O_{11}$ (M=Pb,Fe,Al)", Physica C, vol. 171, No. 3, 4, pp. 344–347, Nov. 1990.

Wada, et al, "New Tl-Based Copper Oxide Containing Double-$Mo_2$-Unit Fluorite Block: $((Tl,Cu)Sr_2(R,Ce)_3Cu_2O_{11}$ (R: Rare Earth Element)", Physica C, vol. 175, No. 3, 4, pp. 529–533, Apr. 1991.

Takahiro Wada, et al, et al, "Homologous compound series containing multiple-$MO_2$-unit fluorite block, $(Fe,Cu)Sr_2(Y,Ce)_nCu_2O_{4+2n+z}$ (n=1, 2, 3, . . . , and $z \sim 1$)", Physica C, (1992), pp. 181–190.

Takahiro Wada, et al, "Crystal Chemistry of Copper-Based Oxide Superconductors and Related Compounds-An Approach to Material Design", Journal of the Ceramic Society of Japan, International Edition, vol. 99, pp. 420–428, (1991).

- ⊘ Pb,Cu
- ● Cu
- ⊘ Sr
- ⊜ Ho,Ce
- ○ O

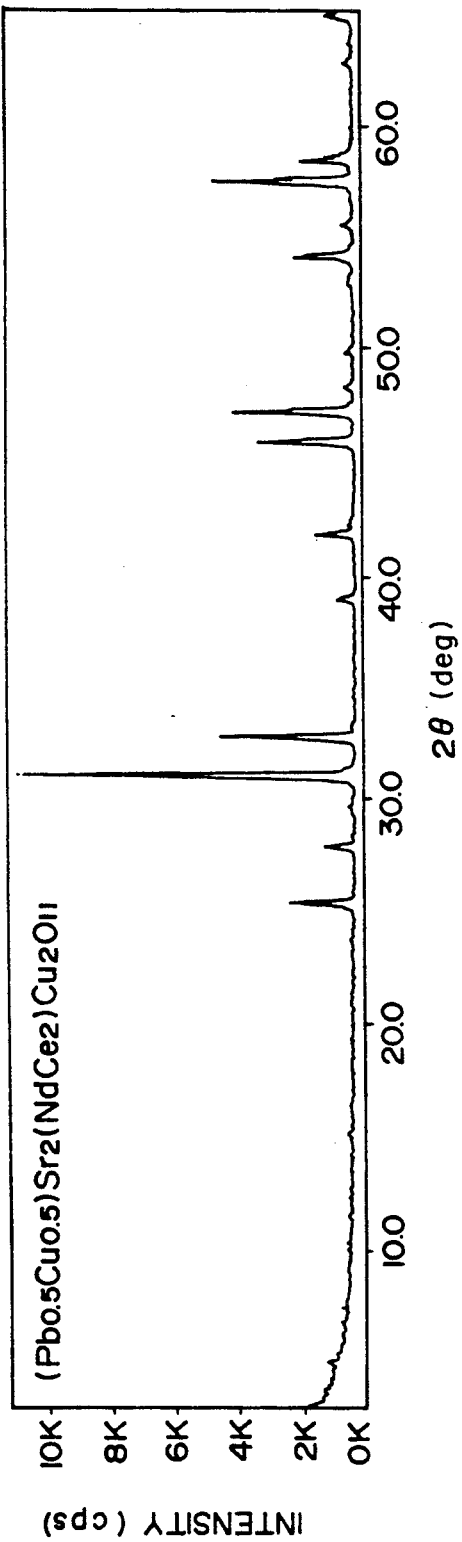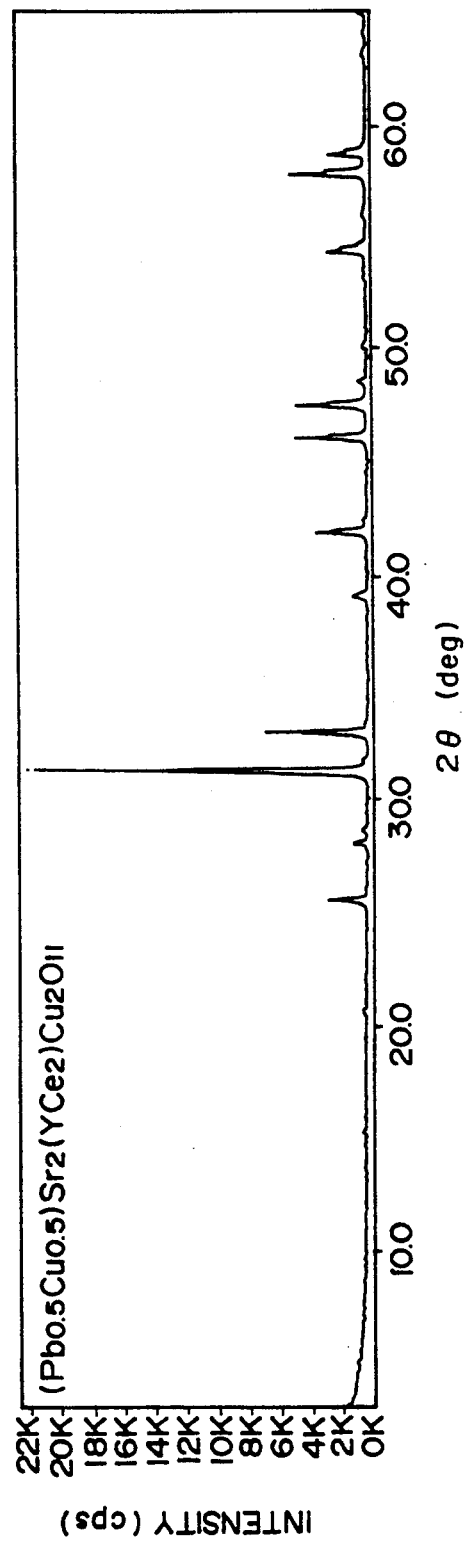
FIG. 3A
FIG. 3B

LAYERED COPPER OXIDES $(R_{(1+x)}CE_{(2-x)})SR_2CU_2(M_{1-y}CU_y)O_{11}$ WHEREIN R IS A RARE EARTH ELEMENT AND M IS ONE OR BOTH OF PB AND TL

BACKGROUND OF THE INVENTION

1. FIELD OF THE INVENTION

The present invention relates to an electronic material used as an insulating material for an oxide superconductor such as $YBa_2Cu_3O_{6+\delta}$, $(Tl,Pb)Sr_2CaCu_2O_7$, or the like.

2. DESCRIPTION OF RELATED ART

Compounds such as $(Eu,Ce)_2(Eu,Ba)_2Cu_3O_{8+z}$, wherein $0z \leq 2$, and $(Pb,Cu)(Sr,Eu)_2(Eu,Ce)_2Cu_2O_9$, which both have the structural unit similar to that of $YBa_2Cu_3O_{6+\delta}$ which is a 90K class superconductor, $(Tl_{0.5}Pb_{0.5})Sr_2CaCu_2O_7$, and $TlBa_2CaCu_2O_7$ which are a 80K class superconductor are known.

These compounds are disclosed in, for example, Yoshiki Tokura, "Solid State Physics", Vol. 25, 1990, pp. 618–636.

However, since these compounds have a structure comprising a $YBa_2Cu_3O_{6+\delta}$-type structural unit or $TlBa_2CaCu_2O_7$-type structural unit and a single fluorite-type structural unit $[(R,Ce)O_2]$ alternately put on each other, they have an electric resistance lowered when the oxide superconductor such as $YBa_2Cu_3O_{6+\delta}$, $(Tl_{0.5}Pb_{0.5})Sr_2CaCu_2O_7$ or the like is made together with them while heat treating. Therefore, these compounds do not adequately function as the insulator for the superconductor.

SUMMARY OF THE INVENTION

The primary object of the present invention is to provide a layered copper oxide having a unique crystal structure and wide range of properties varying from the superconducting to the insulating.

The other objects and novel characteristics of the present invention will be understood from the below and the FIGURES attached hereto.

BRIEF DESCRIPTION OF THE DRAWINGS

FIG. 3A and FIG. 3B are X-ray powder diffraction patterns of the samples of Example 2, $(Pb_{0.5}Cu_{0.5})Sr_2RCe_2Cu_2O_{11}$, wherein R is Nd and Y, respectively.

DETAILED DESCRIPTION OF PREFERRED EMBODIMENTS

Figure 1:
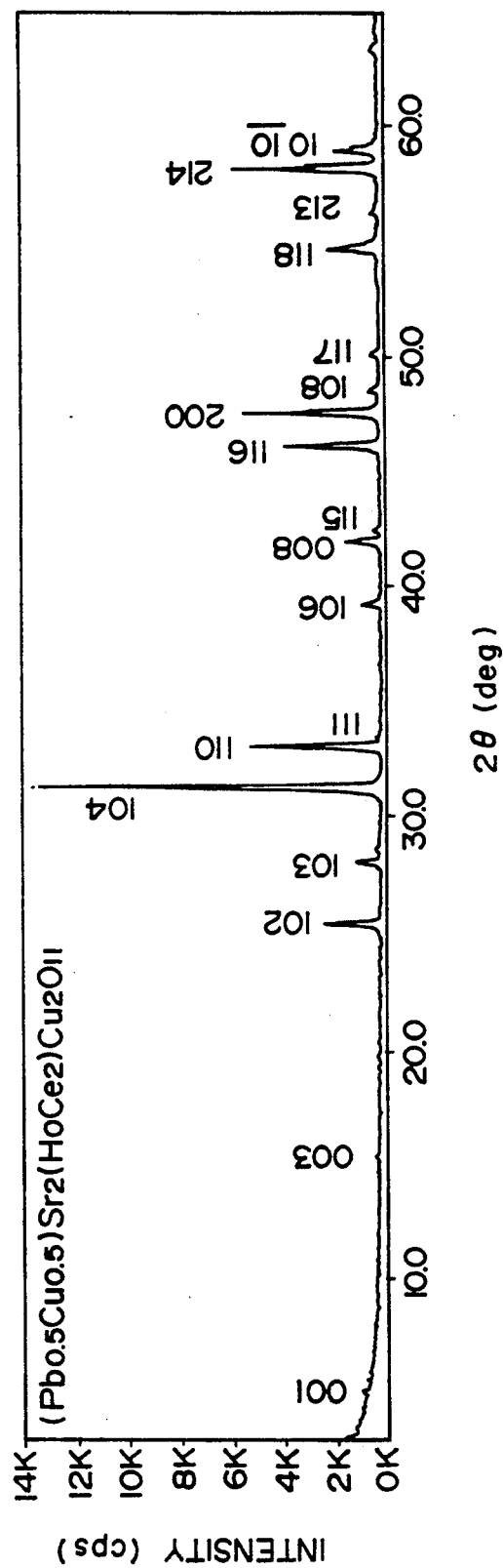
FIG. 1 is an X-ray powder diffraction pattern of $(Pb_{0.5}Cu_{0.5})Sr_2(HoCe_2)Cu_2O_{11}$ according to Example 1 having an index exhibiting the tetragonal unit cell, a=3.82 Angstrom and C=17.21 Angstrom.

The layered copper oxide according to the present invention has a chemical formula represented by $(R,Ce)_3Sr_2Cu_2(M,Cu)O_{10+z}$, wherein R is a rare earth element other than Ce and M is Pb or Tl. If the content of the M element is greater, the oxide has a crystal structure comprising a $(M,Cu)Sr_2(R,Ce)Cu_2O_7$ unit having the $TlBa_2CaCu_2O_7$ (1-2-1-2) type structure and a $[(R,Ce)O_2]_2$ unit having the fluorite-type structure altern put on each other. If the content of the M element is lesser the oxide has a crystal structure comprising a $(R,Ce)Sr_2Cu_3O_{6+z}$ unit having the $YBa_2Cu_3O_{6+\delta}$ (1-2-3) type structure and a $[(R,Ce)O_2]_2$ unit having the fluorite-type structure alternately put on each other. In the abovementioned to or less than 2 ($0 \leq z \leq 2$) and $\delta$ is equal to or more than zero (0) but equal to or less than 1 ($0 \leq \delta \leq 1$).

The prior layered copper oxide has one block of the fluorite-type structural unit, $(R,Ce)O_2$, whereas that of the present invention has two blocks of the unit. Therefore, the layered copper oxide of the present invention keeps an adequately high electric resistance and well functions as an electric insulator even when subjected to the heat treatment which is conducted in synthesizing the superconductor such as $YBa_2Cu_3O_{6+\delta}$ or $(Tl,Pb)Sr_2CaCu_2O_7$, together with the copper oxide.

Furthermore, the layered copper oxide of the present invention has a unit cell of a tetragonal system and an a-axis length very near to that of the known oxide superconductors and, therefore, the copper oxide can easily be laminated on the oxide superconductors by the laminating process.

Still further, the layered copper oxide of the present invention can be changed in from an insulating state to superconducting state by controlling the R/Ce ratio and the M/Cu ratio in the composition of the copper oxide. Therefore, it is highly expected to be applied to various electronic devices.

The present invention will be illustrated below with reference to some examples.

EXAMPLE b 1

99 9%-in-purity powders of PbO, $Ho_2O_3$, $CeO_2$, $SrCO_3$ and CuO, respectively, were mixed together so as to obtain a chemical composition represented by the formula of $(Pb_{0.5}Cu_{0.5})Sr_2(HoCe_2)Cu_2O_y$, and three times calcined in oxygen at a temperature of 1,000° to 1,050° C. The value of y in the formula varies depending upon the ratio of the metal components and the production method.

The resultant mixture was milled and pulverized and then compacted in a rectangular form. This compact was sintered in an oxygen atmosphere at 1,050° C. to obtain a predetermined sample. This sample was heat treated in an oxygen atmosphere at 850° C. for a period of 5 hours which are the conditions for synthesizing the 80K class superconductor, $(Tl_{0.5}Pb_{0.5})Sr_2CaCu_2O_7$. It had a resistivity at 80K of $10^6$ $\Omega$cm or more, which confirmed that it was adequately useful as the insulator for the superconductors, such as $(Tl_{0.5}Pb_{0.5})Sr_2CaCu_2O_7$.

Figure 2:
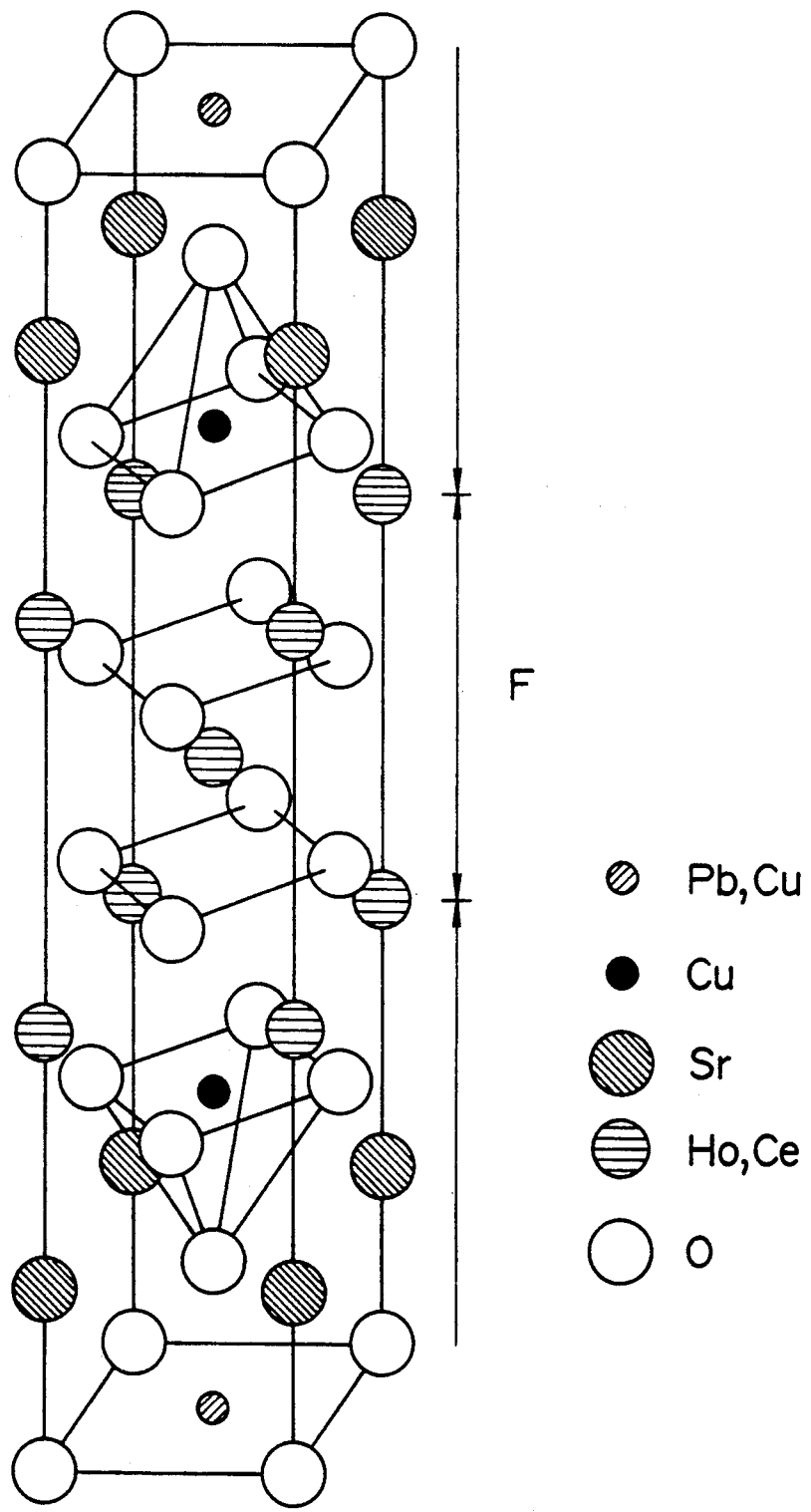
FIG. 2 is a schematical view of the crystal structure of $(Pb_{0.5}Cu_{0.5})Sr_2(HoCe_2)Cu_2O_{11}$ determined by the Rietveld analysis, in which FIG. F represents the portion of the fluorite-type structural unit.

The X-ray powder diffraction pattern of this sample is shown in FIG. 1. The indices of the peaks in the diffraction pattern was determined by hypothesizing the sample as having an a-axis length of about 3.8 Angstrom and a c-axis length of about 17 Angstrom. The thus determined indices are also shown in FIG. 1. The crystal structure of the sample was accurately determined from the data shown in FIG. 1 by the Rietveld analysis. The thus determined crystal structure is schematically shown in FIG. 2. The atomic coordinates of the crystal structure is shown in Table 1.

Table 1 shows the structural parameters determined by the Rietveld analysis of the sample, $(Pb_{0.5}Cu_{0.5})Sr_2(HoCe_2)Cu_2O_{11}$, of Example 1. In Table 1, "g" means an occupying rate, "B" means an isotropic temperature factor and the bracketed values mean standard deviations.

The space group was P4/mm. The lattice constant was $a = 3.82246(5)$ Angstrom and $c = 17.2082(3)$ Angstrom. The R factors were $R_{wp} = 7.37\%$, $R_p = 5.51\%$, $R_1 = 3.81\%$, $R_F = 3.12\%$ and $R_e = 2.72\%$.

TABLE 1

| Atom | Site | g | x | y | z | B(Å$^2$) |
|---|---|---|---|---|---|---|
| Sr | 2 h | 1 | 0.5 | 0.5 | 0.1393(5) | 0.9(2) |
| Ho,Ce(1) | 2 h | 1 | 0.5 | 0.5 | 0.3481(5) | 0.2(1) |
| Ho,Ce(2) | 1 b | 1 | 0.0 | 0.0 | 0.5 | 0.2(1) |
| Pb,Cu | 4 l | 0.25 | 0.0072(9) | 0.0 | 0.0 | 1.3(5) |
| Cu | 2 g | 1 | 0.0 | 0.0 | 0.2439(8) | 0.3(3) |
| O(1) | 4 n | 0.25 | 0.32(3) | 0.5 | 0.0 | 1.4(5) |
| O(2) | 2 g | 1 | 0.0 | 0.0 | 0.115(3) | 1.4(5) |
| O(3) | 4 i | 1 | 0.0 | 0.5 | 0.255(3) | 1.4(5) |
| O(4) | 4 i | 1 | 0.0 | 0.5 | 0.418(2) | 1.4(5) |

The ideal chemical formula of the compound above is $(Pb_{0.5}Cu_{0.5})Sr_2(HoCe_2)Cu_2O_{11}$, which means that z is 1 in the present invention and is characterized by the crystal structure comprising a $(Pb_{0.5}Cu_{0.5})Sr_2(Ho,Ce)Cu_2O_7$ unit of a tetragonal $(Pb,Cu)Sr_2(Y,Ca)Cu_2O_7$ (lead-based "1212") type structure and two blocks of a fluorite-type unit of $[(Ho,Ce)O_2]_2$ alternately put on each other. The a-axis length of this compound is very near to the known a-axis length of the oxide superconductor. Furthermore, this compound includes a crystal structure of a unit very similar to that of a $(Tl,Pb)Sr_2CaCu_2O_7$-type superconductor and, therefore, the compound can easily be laminated on the $(Tl,Pb)Sr_2CaCu_2O_7$-type superconductor.

EXAMPLE 2

1 99.9%-in-purity powders of PbO, $R_2O_3$, wherein R is a rare earth element of Nd, Sm, Eu, Gd, Dy, Er, Tm or Y, except that when R is Pr, the $R_2O_3$ is replaced with $Pr_6CeO_2$, $SrCO_3$ and CuO, respectively, were mixed together so as to obtain a chemical composition of $(Pb_{0.5}Cu_{0.5})Sr_2(RCe_2)Cu_2O_y$ and three times calcine in oxygen at a temperature of 1,000° to 1,050° C. Then, the calcined products were adequately pulverized and mixed, and compacted in a rectangular form. The compacts were sintered in an oxygen atmosphere at a temperature of 1,030° to 1,050° C. to obtain predetermined samples. The samples were heat treated in an oxygen atmosphere at a temperature of 850° C. for a period of 5 hours which are the conditions for synthesizing the 80K class superconductor, $(Tl_{0.5}Pb_{0.5})Sr_2CaCu_2O_7$. They all had a resistivity at 80K of $10^6$ Ωcm or more, which confirmed that they were adequately useful as the insulator for the superconductors, such as $(Tl_{0.5}Pb_{0.5})Sr_2CaCu_3O_7$.

Of the X-ray powder diffraction patterns of the samples, the typical patterns of the samples of R=Nd and R=Y are shown in FIGS. 3A and 3B, respectively. The patterns are highly similar to that of $(Pb_{0.5}Cu_{0.5})Sr_2(HoCe_2)Cu_2O_{11}$ according to Example 1. The diffraction peaks were indexed in the same manner as in Example 1 by hypothesizing to show a tetragonal crystal structure having a unit cell of an a-axis length of about 3.8 Angstrom and a c-axis length of about 17 Angstrom. The ideal chemical formula of the resultant compound is $(Pb_{0.5}Cu_{0.5})Sr_2(RCe_2)Cu_2O_{11}$ and the crystal structure of the compound comprises a $(Pb_{0.5}Cu_{0.5})Sr_2(R,Ce)Cu_2O_7$ unit of a tetragonal $(Pb,Cu)Sr_2(Y,Ca)Cu_2O_7$ (lead-based "1212") type and two layers of a fluorite-type unit of $[(R,Ce)O_2]_2$ alternately put on each other.

EXAMPLE 3

99.9% or more-in-purity powders of $R_2O_3$, wherein R is Eu or Ho, $CeO_2$, $SrCO_3$ and CuO, respectively, were mixed together so as to obtain a chemical composition of $Cu_{0.2}Sr_2(RCe_2)Cu_2O_y$ and two times fired in air at 900° C. to form precursor samples for Tl series. With the precursors was mixed a 99.9% or more-in-purity $Tl_2O_3$ powder so as to obtain a chemical composition of $(Tl_{0.8}Cu_{0.2})Sr_2(RCez)Cu_2O_y$. The resultant mixtures were compacted in a rectangular form. The compacts were sintered in an oxygen atmosphere at 1,080° C. to obtain predetermined samples. These samples were heat treated in an oxygen atmosphere at a temperature of 850° C. for a period of 5 hours which are the conditions for synthesizing the superconductor, $(Tl_{0.5}Pb_{0.5})Sr_2CaCu_2O_7$. They all had a resistivity at 80K of $10^6$ Ωcm or more, which confirmed that they were adequately useful as the insulator for the superconductors, such as $(Tl_{0.5}Pb_{0.5})Sr_2CaCu_3O_7$.

Figure 4A:
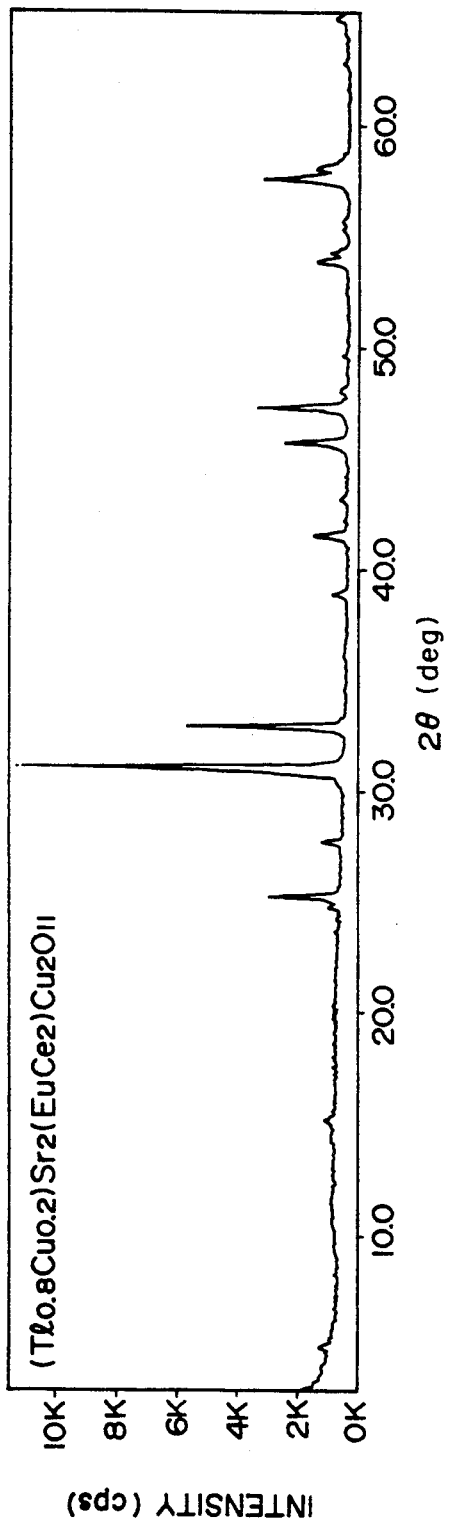
FIG. 4A and FIG. 4B are X-ray powder diffraction patterns of the samples of Example 3, $(Tl_{0.8}Cu_{0.2})Sr_2(EuCe_2)Cu_2O_{11}$ and $(Tl_{0.9}Cu_{0.2})Sr_2(HoCe_2)Cu_2O_{11}$, respectively.
Figure 4B:
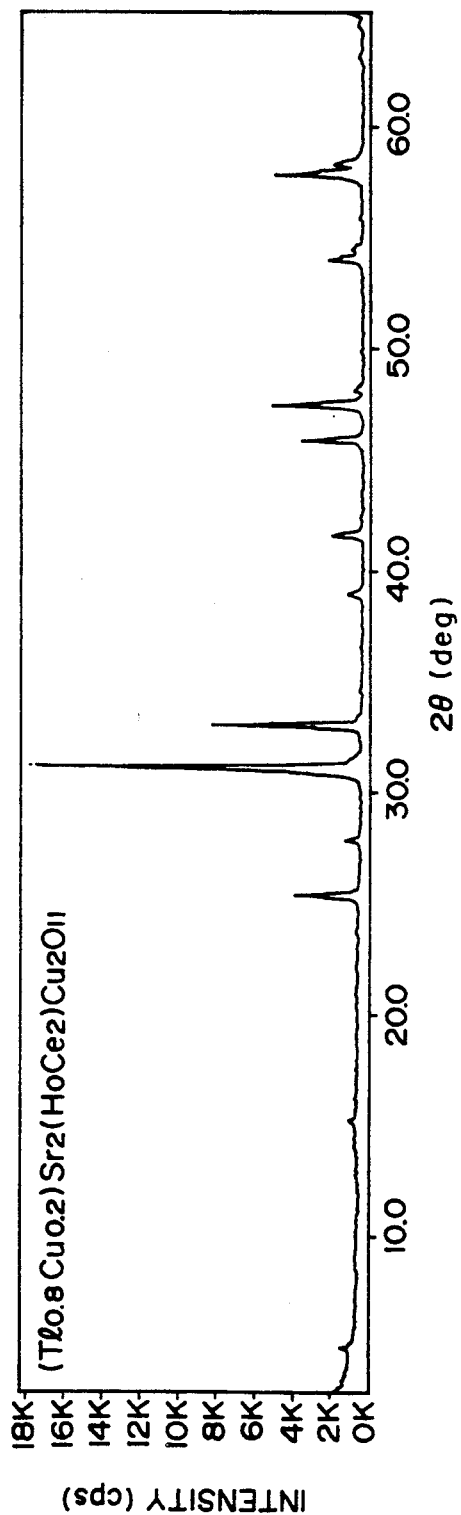

The X-ray powder diffraction patterns of these samples are shown in FIGS. 4A and 4B. The patterns are highly similar to that of $(Pb_{0.5}Cu_{0.5})Sr_2(HoCe_2)Cu_2O_{11}$ according to Example 1. The diffraction peaks were indexed in the same manner as in Example 1 by hypothesizing the samples as having a tetragonal crystal structure having a unit cell of an a-axis length of about 3.8 Angstrom and a c-axis length of about 17 Angstrom. The crystal structures of these samples also comprises a $(Tl_{0.8}Cu_{0.2})Sr_2(R,Ce)Cu_2O_7$ unit of a tetragonal $(Pb,Cu)Sr_2(Y,Ca)Cu_2O_7$ (lead-based "1212") type and two blocks of a fluorite-type unit of $[(R,Ce)O_2]_2$ alternately put on each other.

EXAMPLE 4

99.9% or more-in-purity powders of $Ho_2O_3$, $CeO_2$, $SrCO_3$ and CuO, respectively were mixed together so as to obtain a chemical composition of $(HoCe_2)Sr_2Cu_3O_y$, and three times calcined in oxygen at a temperature of 1,000° to 1,020° C. The resultant mixture was then pulverized and compacted in a rectangular form. The compact was sintered in an oxygen atmosphere at 1,030° C. to obtain a predetermined sample. This sample was heat treated in an oxygen atmosphere at a temperature of 950° C. for a period of 5 hours which are the conditions for synthesizing the 90K class superconductor of $YBa_2Cu_3O_7$, and then annealed in an oxygen stream at 400° C. It had a resistivity at 90K of $10^6$ Ωcm or more, which confirmed that it was adequately useful as the insulator for the superconductors, such as $YBa_2Cu_3O_7$.

Figure 5:
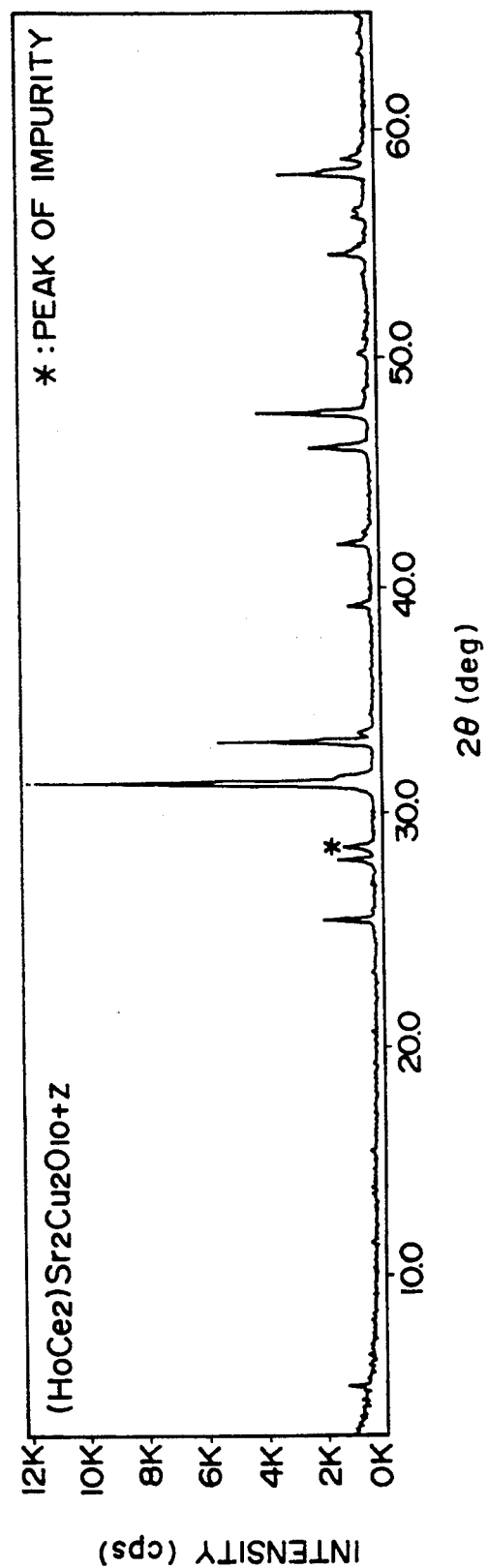
FIG. 5 is an X-ray powder diffraction pattern of the sample of Example 4, $(HoCe_2)Sr_2Cu_3O_{10+z}$.
Figure 6:
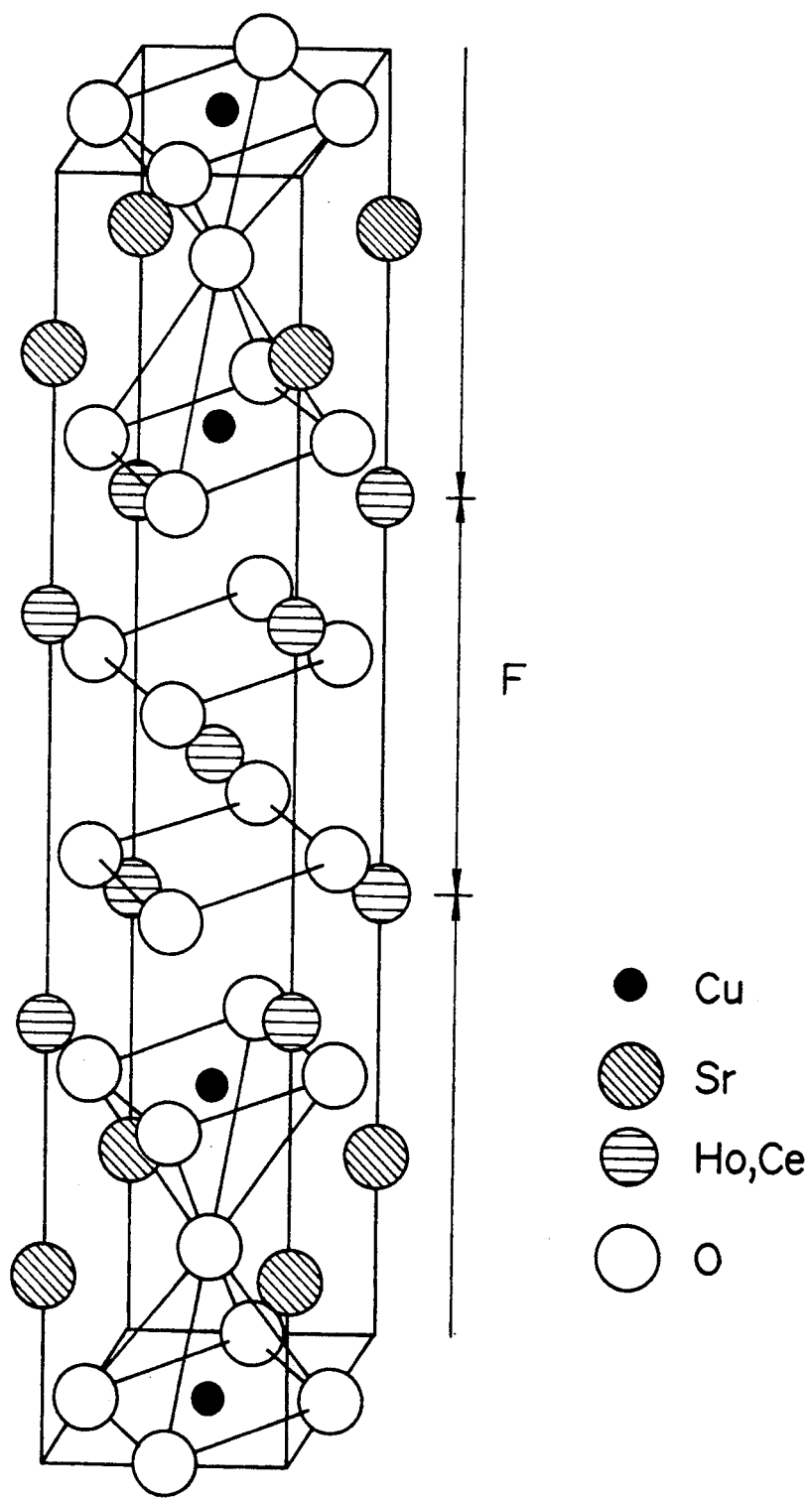
FIG. 6 is a schematical view of the crystal structure of the sample of Example 4, $(HoCe_2)Sr_2Cu_3O_{10+z}$, in which FIG. F represents the portion of the fluorite-type structural unit.

The X-ray powder diffraction pattern of the sample is shown in FIG. 5. The pattern is very similar to that of the $(Pb_{0.5}Cu_{0.5})Sr_2(HoCe_2)Cu_2O_{11}$ of Example 1. The diffraction peaks were indexed in the same manner as in Example 1 by hypothesizing the samples as having a tetragonal crystal structure having a unit cell of an a-axis length of about 3.8 Angstrom and a c-axis length of about 17 Angstrom. However, the structure analysis revealed that this sample was different in the oxygen position from the $(Pb_{0.5}Cu_{0.5})Sr_2(HoCe_2)Cu_2O_{11}$. The crystal structure of the resultant compound is schematically shown in FIG. 6, from which it is seen that it had a structure comprising a $(Ho,Ce)Sr_2Cu_3O_{6+\delta}$ unit of a tetragonal $YBa_2Cu_3O_{6+\delta}$ type and two blocks of a fluorite-type unit of $[(R,Ce)O_2]_2$ alternately put on each other.

EXAMPLE 5

99.9% or more-in-purity powders of $Ho_2O_3$, $CeO_2$, $SrCO_3$ and $CuO$, respectively, were mixed together so as to obtain a chemical composition of $Cu_xSr_2(HoCe_2)Cu_2C_y$, wherein x is 0.2, 0.4, 0.6 or 0.8, and two times fired in air at a temperature of 900° C. to form precursors for Tl series. With these precursors was mixed a 99.9% or more-in-purity $Tl_2O_3$ powder so as to obtain a chemical composition of $(Tl_{1-x}Cu_x)Sr_2(HoCe_2)Cu_2O_y$. The resultant mixtures were compacted in a rectangular form. The compacts were sintered in an oxygen atmosphere at a temperature of 1,050° to 1,080° C. to form predetermined samples. The samples were heat treated in an oxygen atmosphere at a temperature of 850° C. for a period of 5 hours which are the conditions for synthesizing the 80K class superconductor of $(Tl_{0.5}Pb_{0.5})Sr_2CaCu_2O_7$. They all had a resistivity at 80K of $10^6 \Omega cm$ or more which confirmed that they were adequately useful as the insulator for the superconductors, such as $(Tl_{0.5}Pb_{0.5})Sr_2CaCu_2O_7$.

The X-ray powder diffraction patterns of these samples are very similar to the pattern of $(Pb_{0.5}Cu_{0.5})Sr_2(HoCe_2)Cu_2O_{11}$ of Example 1 or $(Ho,Ce)_3Sr_2Cu_2O_{10+z}$ of Example 4. The peaks of the pattern all were indexed by hypothesizing the samples as having a tetragonal unit cell of an a-axis length of about 3.8 Angstrom and a c-axis length of about 17 Angstrom. Therefore, it is assumed that the crystal structure of the samples also comprises a $(Tl,Cu)Sr_2(R,Ce)Cu_2O_7$ unit of a tetragonal $(Pb,Cu)Sr_2(Y,Ca)Cu_2O_7$ (lead-based "1212") type, $YBa_2Cu_3O_{6+\delta}$ type or intermediate type therebetween, and two blocks of a fluorite-type unit of $[(R,Ce)O_2]_2$ alternately put on each other.

In this case, the content of one or both of Pb and Tl (M) is reduced, and the changing width of z is larger within a range of $0 \leq z \leq 2$.

EXAMPLE 6

99.9% or more-in-purity powders of PbO, $Eu_2O_3$, $CeO_2$, $SrCO_3$ and $CuO$, respectively, were mixed together so as to obtain a chemical composition of $(Pb_{0.5}Cu_{0.5})Sr_2(Eu_{1+x}Ce_{2-x})Cu_2O_y$, wherein x is 0.1, 0.2 or 0.3, and three times calcined in oxygen at a temperature of 1,000° to 1,050° C. The calcined powder was compacted in a rectangular form and sintered in an oxygen atmosphere to form predetermined samples. These samples were heat treated in an oxygen atmosphere at a temperature of 1,000° C. for a period of 3 hours which are the conditions for synthesizing the 70K class superconductors, such as $(Pb_{0.5}Cu_{0.5})Sr_2(Y,Ca)Cu_2O_7$. They all had a resistivity at 70K of $10^6 \Omega cm$ or more which confirmed that they are adequately useful as an insulator for the oxide superconductors such as $(Pb,Cu)Sr_2(Y,Ca)Cu_2O_7$.

The X-ray powder diffraction patterns of these samples are very similar to that of $(Pb_{0.5}Cu_{0.5})Sr_2(HoCe_2)Cu_2O_{11}$ in Example 1. The X-ray peaks were indexed in the same manner as in Example 1 by hypothesizing the samples as having a tetragonal unit cell of an a-axis length of about 3.8 Angstrom and a c-axis length of about 17 Angstrom. Therefore, it is understood that the crystal structure of the samples also comprises a $(Pb,Cu)Sr_2(Y,Ca)Cu_2O_7$ unit of a tetragonal $(Pb,Cu)Sr_2(Y,Ca)Cu_2O_7$ (lead-series "1212") type, and two layers of a fluorite-type unit of $[(R,Ce)O_2]_2$ alternately put on each other.

These compounds have a resistivity lowered as the content (1+x) of Eu is decreased. Therefore, they can be expected to exhibit superconductivity by introducing an adequate amount of carrier holes into them, like the oxide superconductors such as $(La,Sr)_2CuO_4$.

EXAMPLE 7

99.9% or more-in-purity powders of $Eu_2O_3$, $CeO_2$, $SrCO_3$ and $CuO$, respectively, mixed together so as to obtain a chemical composition of $Cu_xSr_2(EuCe_2)Cu_2O_y$, wherein x is 0.4 or 0.6, and two time fired in air at a temperature of 900° C. to form precursors for Tl series. With the precursors was mixed a 99.9% or more-in-purity $Tl_2O_3$ powder to obtain a chemical composition of $(Tl_{1-x}Cu_x)Sr_2(HoCe_2)Cu_2O_2O_y$. The resultant mixture was compacted in a rectangular form, sintered in an oxygen atmosphere at a temperature of 1,050° to 1,080° C. and fully heat treated in an oxygen atmosphere to form predetermined samples. The dependency of the electric resistance of the samples on the temperature was observed and, as a result, it was found that the samples were transformed to a superconductor at about 20K.

The X-ray powder diffraction patterns of these samples are very similar to that of $(Pb_{0.5}Cu_{0.5})Sr_2(HoCe_2)Cu_2O_{11}$ in Example 1. The diffraction peaks were indexed in the same manner as in Example 1 by hypothesizing the samples as having a tetragonal unit cell of an a-axis length of about 3.8 Angstrom and a c-axis length of about 17 Angstrom. Therefore, it is understood that the crystal structure of the samples also comprises a unit of a tetragonal $(Pb,Cu)Sr_2(Y,Ca)Cu_2O_7$ (lead-based "1212") type or $YBa_2Cu_3O_{6+\delta}$, and two blocks of a fluorite-type unit of $[(R,Ce)O_2]_2$ alternately put on each other.

EXAMPLE 8

99.9% or more-in-purity powders of PbO, $Ho_2O_3$, $CeO_2$, $SrCO_3$ and $CuO$, respectively, were mixed together so L as to obtain a chemical composition of $Pb_{0.5}Sr_2(HoCe_2)Cu_2O_y$, and two times fired in air at a temperature of 900° C. to form a precursor for Tl series. With the precursor was mixed a 99.9% or more-in-purity powder of $Tl_2O_3$ to obtain a chemical composition of $(Tl_{0.5}Pb_{0.5})Sr_2(HoCe_2)Cu_2O_y$. The resultant powder was compacted in a rectangular form. The compact was sintered in an oxygen atmosphere at a temperature of 1,080° C. to form a predetermined sample. The sample was heat treated in an oxygen atmosphere at a temperature for a period of 5 hours which are the conditions for synthesizing the 80K class oxide superconductor such as $(Tl_{0.5}Pb_{0.5})Sr_2CaCu_2O_7$. It had a resistivity at 80K of $10^6 \Omega cm$ or more, which confirmed that they are adequately useful as an insulator for the oxide superconductors such as $(Tl_{0.5}Pb_{0.5})Sr_2CaCu_2O_7$.

The X-ray powder diffraction pattern of this sample is very similar to that of $(Pb_{0.5}Cu_{0.5})Sr_2(HoCe_2)Cu_2O_{11}$ in Example 1. The diffraction peaks were indexed in the same manner as in Example 1 by hypothesizing the samples as having a tetragonal unit cell of an a-axis length of about 3.8 Angstrom and a c-axis length of about 17 Angstrom. Therefore, it is understood that the crystal structure of the samples also comprises a $(Tl_{0.8}Cu_{0.2})Sr_2(R,Ce)Cu_2O_7$ unit of a tetragonal $(Pb,Cu)Sr_2(Y,Ca)Cu_2O_7$ (lead-based "1212") type and two blocks of a fluorite-type unit of $[(R,Ce)O_2]_2$ alternately put on each other.

From the foregoing, it is seen that the layered copper oxide of the present invention is fully expected as various electronic materials, since it has a unique crystal structure and can be widely changed in from an insulating state to superconducting state.

What is claimed is:

1. A layered copper oxide which has a chemical composition represented by the formula of $(R_{(1+x)})Sr_2Cu_2(M_{1-y}Cu_y)O_{11}$, where R is a rare earth element other than Ce, M is one or both of Pb and Tl, $0 \leq x \leq 0.3$ and $0 \leq y \leq 1.0$, and has a crystal structure comprising a $(M,Cu)Sr_2(R,Ce)Cu_2O_7$ unit of a $TlBa_2CaCu_2C_2O_7$ (1-2-1-2)-type structure and a $[(R,Ce)O_2]_2$ unit of a fluorite-type structure alternatively put on each other.

2. A layered copper oxide which has a chemical composition represented by the formula of $(R_{(1+x)})Ce_{(2-x)})Sr_2Cu_2(M_{1-y}Cu_y)O_{10+z}$, wherein R is a rare earth element other than Ce, M is one or both of Pb and Tl, $0 \leq x \leq 0.3$ and $0 \leq y \leq 1.0$, $0 \leq z \leq 2$, and has a crystal structure comprising a $(R,Ce)Sr_2Cu_2(M,Cu)O_{6=z}$, unit of a $YBa_2Cu_3O_{6+\delta}$-type structure, wherein $0 \leq \delta \leq 1$, and a $[(R,Ce)O_2]_2$ unit of a fluorite-type structure alternatively put on each other.

* * * * *